United States Patent
Ikeda

(10) Patent No.: US 11,128,849 B2
(45) Date of Patent: Sep. 21, 2021

(54) VIDEO SIGNAL CONVERSION DEVICE, VIDEO SIGNAL CONVERSION METHOD, AND NON-TRANSITORY STORAGE MEDIUM

(71) Applicants: TOYO INK SC HOLDINGS CO., LTD., Tokyo (JP); TOYO INK CO., LTD., Tokyo (JP)

(72) Inventor: Takumi Ikeda, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 17/049,962

(22) PCT Filed: Apr. 22, 2019

(86) PCT No.: PCT/JP2019/016977
§ 371 (c)(1),
(2) Date: Oct. 23, 2020

(87) PCT Pub. No.: WO2019/208481
PCT Pub. Date: Oct. 31, 2019

(65) Prior Publication Data
US 2021/0243417 A1    Aug. 5, 2021

(30) Foreign Application Priority Data

Apr. 24, 2018  (JP) .............................. JP2018-082950

(51) Int. Cl.
*H04N 9/64* (2006.01)
*H04N 7/01* (2006.01)
(52) U.S. Cl.
CPC ............. *H04N 9/64* (2013.01); *H04N 7/0135* (2013.01)

(58) Field of Classification Search
CPC .. H04N 9/64; H04N 9/67; H04N 9/69; H04N 7/0135; H04N 7/01; G09G 5/02; G09G 5/028
(Continued)

(56) References Cited

U.S. PATENT DOCUMENTS

2010/0259689 A1* 10/2010 Tanaka ..................... G09G 5/02
                                                    348/708
2011/0216109 A1*  9/2011 Ueki ..................... G09G 3/3607
                                                    345/690
2017/0140734 A1   5/2017 Kageyama et al.

FOREIGN PATENT DOCUMENTS

JP   H11119638    4/1999
JP   2001251641   9/2001
(Continued)

OTHER PUBLICATIONS

"International Search Report (Form PCT/ISA/210) of PCT/JP2019/016977," dated Jun. 11, 2019, with English translation thereof, pp. 1-4.
(Continued)

*Primary Examiner* — Sherrie Hsia
(74) *Attorney, Agent, or Firm* — JCIPRNET

(57) ABSTRACT

A video signal conversion device includes an RGB converter. The RGB converter converts gradation values of an input R signal, an input G signal, and an input B signal of three primary colors based on a conversion table or conversion formula to generate an output R signal, an output G signal, and an output B signal. The RGB converter, when it is designated, by a cataract degree designating signal that designates a degree of cataract including a degree of light scattering, that it is a cataract with light scattering, decreases the gradation values of the input R signal, the input G signal, and the input B signal, in a range from the minimum gradation value to a predetermined intermediate gradation
(Continued)

value less than the maximum gradation value, with a linear characteristic of not converting gradation values as a reference.

21 Claims, 8 Drawing Sheets

(58) Field of Classification Search
USPC ........ 348/441, 453, 661, 708; 382/162, 167; 345/600, 601, 603, 604, 606, 610
See application file for complete search history.

(56) References Cited

FOREIGN PATENT DOCUMENTS

| | | |
|---|---|---|
| JP | 2009025761 | 2/2009 |
| JP | 2017085461 | 5/2017 |
| WO | 2016017081 | 2/2016 |

OTHER PUBLICATIONS

"Office Action of Japan Counterpart Application", dated Nov. 20, 2018, with English translation thereof, p. 1-p. 8.

* cited by examiner

VIDEO SIGNAL CONVERSION DEVICE, VIDEO SIGNAL CONVERSION METHOD, AND NON-TRANSITORY STORAGE MEDIUM

CROSS-REFERENCE TO RELATED APPLICATION

This application is a 371 application of an international PCT application serial no. PCT/JP2019/016977, filed on Apr. 22, 2019, which claims the priority benefit of Japan application JP2018-082950, filed on Apr. 24, 2018. The entirety of each of the above-mentioned patent applications is hereby incorporated by reference herein and made a part of this specification.

TECHNICAL FIELD

The present disclosure relates to a video signal conversion device, a video signal conversion method, and a video signal conversion program capable of bringing a video image viewed by a person with cataracts closer to a video image viewed by a person with normal sight.

BACKGROUND ART

A crystalline lens in the human eye is composed of a protein, and the protein may degenerate due to aging and other factors, and the crystalline lens becomes opaque. A disease in which an opacification of the crystalline progresses is called a cataract. When the protein of the crystalline lens becomes opaque, a proportion (spectral transmittance) of light that passes through the crystalline lens is not attenuated uniformly in a visible light wavelength region where humans can perceive colors, but is greatly attenuated in a short wavelength region. For that reason, since blue color perception of the person with cataracts is reduced, the person with cataracts visually recognizes a video image displayed on a television set or the like in a yellowish state.

Patent Literature 1 to 4 describes a video signal conversion device that corrects brightness or color of a video signal in order to bring the video image viewed by a person with cataracts closer to the video image viewed by a person with normal sight.

CITATION LIST

Patent Literature

Patent Literature 1: Japanese Unexamined Patent Application Publication No. 2001-251641
Patent Literature 2 Japanese Unexamined Patent Application Publication No. 2009-25761
Patent Literature 3 International Publication No. WO 2016/017081 Patent Literature 4 Japanese Unexamined Patent Application Publication No. 2017-85461

SUMMARY OF INVENTION

In persons with cataracts, persons with cataracts who have light scattering due to opacity of the crystalline lens and a person with cataracts who do not have light scattering are present. Accordingly, the video image viewed by the person with cataracts cannot be brought closer to the image viewed by the person with normal sight without considering the presence or absence of light scattering.

An object of the embodiments is to provide a video signal conversion device, a video signal conversion method, and a video signal conversion program capable of bringing the video image viewed by a person with cataracts closer to the video image viewed by a person with normal sight in consideration of a degree of light scattering.

A first aspect of the embodiments provides a video signal conversion device including an RGB converter configured to convert gradation values of an input R signal, an input G signal, and an input B signal of three primary colors based on a conversion table or a conversion formula to generate an output R signal, an output G signal, and an output B signal, wherein when it is designated, by a cataract degree designating signal that designates a degree of cataract including a degree of light scattering, that it is a cataract with light scattering, the RGB converter decreases the gradation values of the input R signal, the input G signal, and the input B signal, in a range from a minimum gradation value to a predetermined intermediate gradation value less than a maximum gradation value, with a linear characteristic of not converting gradation values of the output R signal, the output G signal, and the output B signal as a reference with respect to the gradation values of the input R signal, the input G signal, and the input B signal.

A second aspect of the embodiments provides a video signal conversion method including receiving a cataract degree designating signal that designates a degree of cataract including a degree of light scattering; and when it is designated, by the cataract degree designating signal, that it is a cataract with light scattering, generating an output R signal, an output G signal, and an output B signal by decreasing gradation values of an input R signal, an input G signal, and an input B signal of three primary colors, in a range from the minimum gradation value to a predetermined intermediate gradation value less than the maximum gradation value, with a linear characteristic of not converting gradation values of the output R signal, the output G signal, and the output B signal as a reference with respect to the gradation values of the input R signal, the input G signal, and the input B signal.

A third aspect of the embodiments provides a video signal conversion program configured to cause a computer to execute: a receiving step of receiving a cataract degree designating signal that designates a degree of cataract including a degree of light scattering; and when it is designated, by the cataract degree designating signal, that it is a cataract with light scattering, a generating step of generating an output R signal, an output G signal, and an output B signal by decreasing gradation values of an input R signal, an input G signal, and an input B signal of three primary colors, in a range from the minimum gradation value to a predetermined intermediate gradation value less than the maximum gradation value, with a linear characteristic of not converting gradation values of the output R signal, the output G signal, and the output B signal as a reference with respect to the gradation values of the input R signal, the input G signal, and the input B signal.

In accordance with the video signal conversion device, the video signal conversion method, and the video signal conversion program according to the embodiments, the video image viewed by the person with cataracts can be brought closer to the video image viewed by the person with normal sight in consideration of the degree of light scattering.

DESCRIPTION OF EMBODIMENTS

Hereinafter, a video signal conversion device, a video signal conversion method, and a video signal conversion program according to an embodiment will be described with reference to the accompanying drawings.

Figure 1:
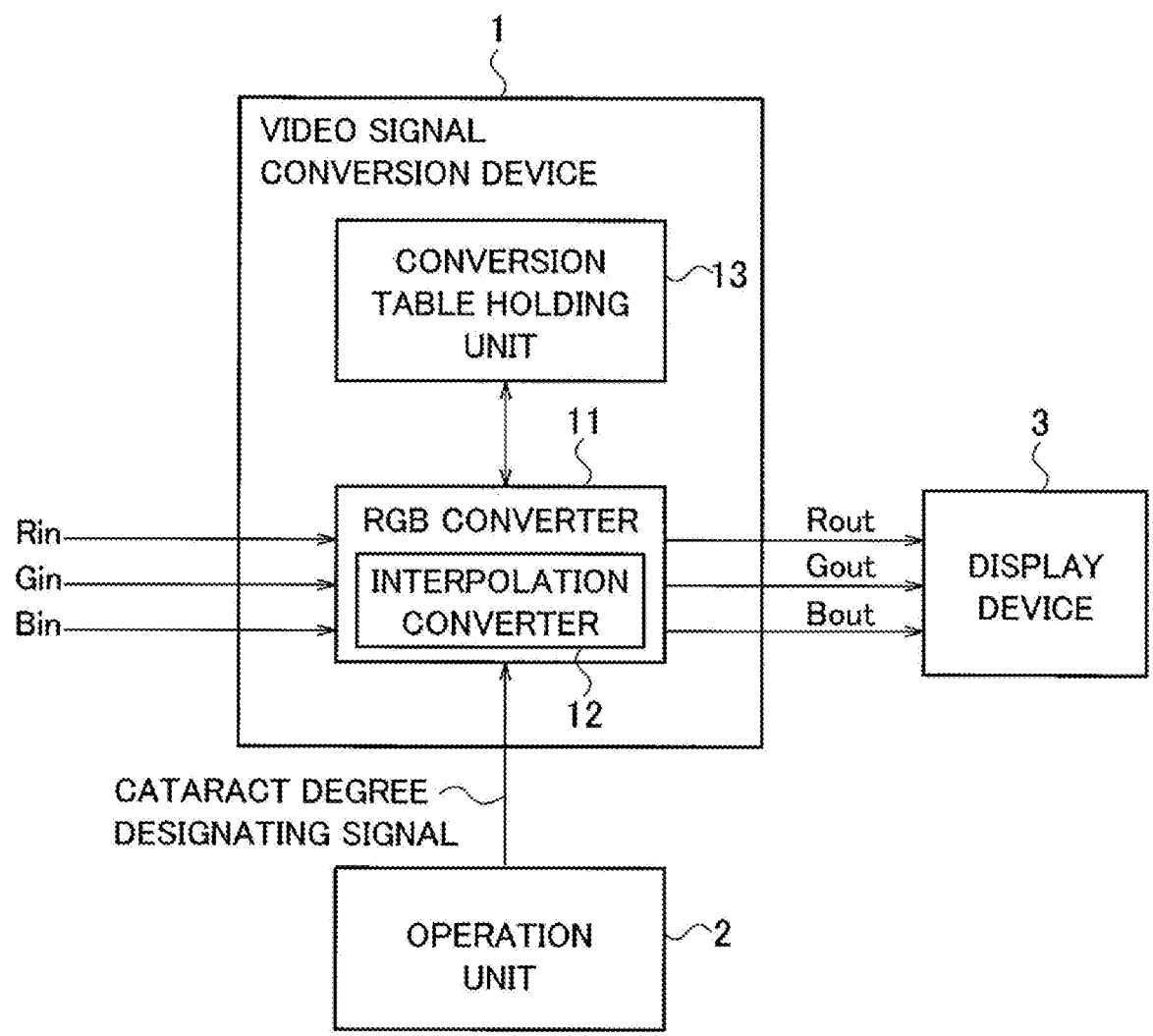
FIG. 1 is a block diagram illustrating a video signal conversion device of an embodiment.

In FIG. 1, an R (red) signal Rin, a G (green) signal Gin, and a B (blue) signal Bin of three primary colors are input as video signals to a video signal conversion device 1 according to an embodiment. The video signal may be a moving image signal or a still image signal. The video signal conversion device 1 includes an RGB converter 11 and a conversion table holding unit 13. The RGB converter 11 includes an interpolation converter 12. It is not essential that the RGB converter 11 includes the interpolation converter 12, but it is preferable that the RGB converter 11 includes the interpolation converter 12.

The RGB converter 11 converts gradation values of an input R signal Rin, an input G signal Gin, and an input B signal Bin based on a conversion table held in the conversion table holding unit 13 to generate an R output signal Rout, an output G signal Gout, and an output B signal Bout. The output R signal Rout, the output G signal Gout, and the output B signal Bout are supplied to an arbitrary display device 3 such as a television set or a monitor device to display a video image.

A person with cataracts who views the video image displayed on the display device 3 operates an operation unit 2 to select his or her own degree of cataract. The operation unit 2 supplies a cataract degree designating signal indicating the degree of cataract to the RGB converter 11. The RGB converter 11 receives the cataract degree designating signal. The degree of cataract includes a degree of light scattering in addition to a degree of cataract progression. The degree of light scattering may be in two levels of "with" and "without" light scattering. The cataract degree designating signal is a signal that designates the degree of light scattering in addition to the degree of cataract. Hereinafter, the degree of light scattering will be described in two stages.

As will be described later, the conversion table holding unit 13 holds the conversion tables for each degree of cataract according to the presence or absence of light scattering. The RGB converter 11 selects a conversion table according to the presence or absence of light scattering and the degree of cataract designated by the cataract degree designating signal. The RGB converter 11 converts the input R signal Rin, the input G signal Gin, and the input B signal Bin into the output R signal Rout, the output G signal Gout, and the output B signal Bout based on the selected conversion table.

Instead of the conversion table holding unit 13, a conversion formula holding unit that holds conversion formulas for converting the input R signal Rin, the input G signal Gin, and the input B signal Bin into the output R signal Rout, the output G signal Gout, and the output B signal Bout may be provided like the conversion characteristic by the conversion table described later. In this case, the RGB converter 11 selects a conversion formula according to the presence or absence of light scattering and the degree of cataract designated by the cataract degree designating signal. The RGB converter 11 converts the input R signal Rin, the input G signal Gin, and the input B signal Bin into the output R signal Rout, the output G signal Gout, and the output B signal Bout based on the selected conversion formula.

In FIG. 1, although the video signal conversion device 1 is provided outside the display device 3, the video signal conversion device 1 may be built in the display device 3. Although the video signal conversion device 1 includes the conversion table holding unit 13, a storage device provided outside the video signal conversion device 1 may store the conversion tables or the conversion formulas. In this case, the RGB converter 11 may read a conversion table or a conversion formula from the storage device and convert the gradation values of the input R signal Rin, the input G signal Gin, and the input B signal Bin. The external storage device may be a server connected to the video signal conversion device 1 by a network such as the Internet.

Figure 2:
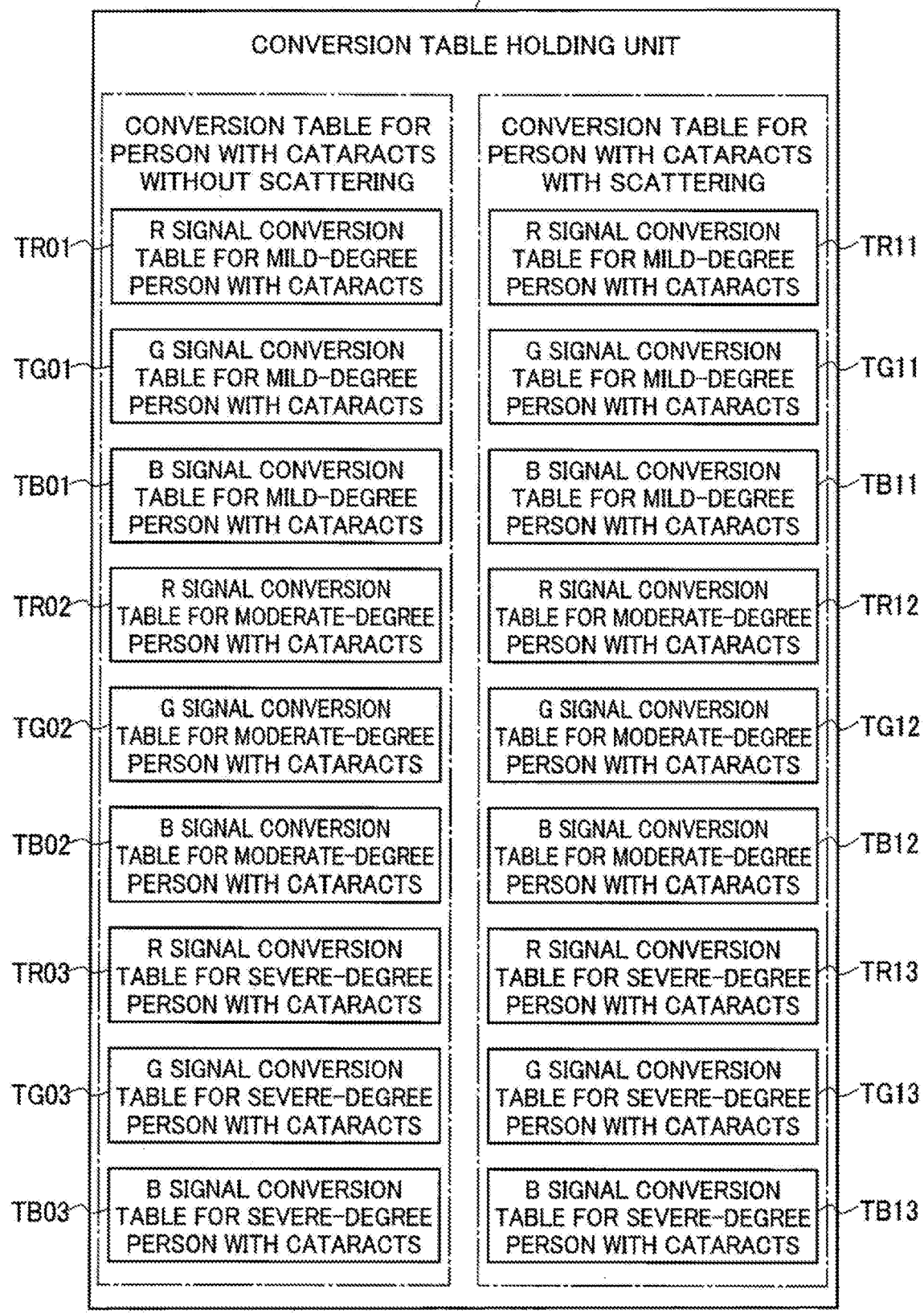
FIG. 2 is a block diagram illustrating conversion tables included in a conversion table holding unit 13 in FIG. 1.

As illustrated in FIG. 2, the conversion table holding unit 13 holds "conversion tables for a person with cataracts without scattering" for a person with cataracts without light scattering and "conversion tables for a person with cataracts with scattering" for a person with cataracts with light scattering.

The conversion tables for a person with cataracts without scattering includes an R signal conversion table for a mild-degree person with cataracts TR01, a G signal conversion table for a mild-degree person with cataracts TG01, and a B signal conversion table for a mild-degree person with cataracts TB01. The conversion tables for a person with cataracts without scattering includes an R signal conversion table for a moderate-degree person with cataracts TR02, a G signal conversion table for a moderate-degree person with cataracts TG02, and a B signal conversion table for a moderate-degree person with cataracts TB02. The conversion tables for a person with cataracts without scattering includes an R signal conversion table for a severe-degree person with cataracts TR03, a G signal conversion table for a severe-degree person with cataracts TG03, and a B signal conversion table for a severe-degree person with cataracts TB03.

Hereinafter, the R signal conversion table for a mild-degree person with cataracts TR01, the G signal conversion table for a mild-degree person with cataracts TG01, and the B signal conversion table for a mild-degree person with cataracts TB01 are abbreviated as conversion tables TR01, TG01, and TB01, respectively. The R signal conversion table for a moderate-degree person with cataracts TR02, the G signal conversion table for a moderate-degree person with cataracts TG02, and the B signal conversion table for a moderate-degree person with cataracts TB02 are abbreviated as conversion tables TR02, TG02, and TB02, respectively. The R signal conversion table for a severe-degree person with cataracts TR03, the G signal conversion table for a severe-degree person with cataracts TG03, and the B signal conversion table for a severe-degree person with cataracts TB03 are abbreviated as conversion tables TR03, TG03, and TB03, respectively.

The conversion tables for a person with cataracts with scattering includes an R signal conversion table for a mild-degree person with cataracts TR11, a G signal conversion table for a mild-degree person with cataracts TG11, and a B signal conversion table for a mild-degree person with cataracts TB11. The conversion tables for a person with cataracts with scattering includes an R signal conversion table for a moderate-degree person with cataracts TR12, a G signal conversion table for a moderate-degree person with cataracts TG12, and a B signal conversion table for a moderate-degree person with cataracts TB12. The conversion tables for a person with cataracts with scattering includes an R signal conversion table for a severe-degree person with cataracts TR13, a G signal conversion table for a severe-degree person with cataracts TG13, and a B signal conversion table for a severe-degree person with cataracts TB13.

Hereinafter, the R signal conversion table for a mild-degree person with cataracts TR11, the G signal conversion table for a mild-degree person with cataracts TG11, and the B signal conversion table for a mild-degree person with cataracts TB11 are abbreviated as conversion tables TR11, TG11, and TB11, respectively. The R signal conversion table for a moderate-degree person with cataracts TR12, the G signal conversion table for a moderate-degree person with cataracts TG12, and the B signal conversion table for a moderate-degree person with cataracts TB12 are abbreviated as conversion tables TR12, TG12, and TB12, respectively. The R signal conversion table for a severe-degree person with cataracts TR13, the G signal conversion table for a severe-degree person with cataracts TG13, and the B signal conversion table for a severe-degree person with cataracts TB13 are abbreviated as conversion tables TR13, TG13, and TB13, respectively.

Here, although the conversion table is set by dividing the degree of cataract into three levels of a mild degree, a moderate degree, and a severe degree, the degree of cataract may be divided into two levels of mild degree and severe degree, and may be divided into four or more levels. Furthermore, the degree of cataract is set to only single, and the conversion table may be different simply depending on the presence or absence of scattering. Of course, it is preferable to set the conversion table by dividing the degree of cataract into two or more levels.

Conversion characteristics by each conversion table will be described with reference to FIGS. 3 to 11. The case where the input R signal Rin, the input G signal Gin, and the input B signal Bin are 8 bits is taken as an example.

Figure 3:
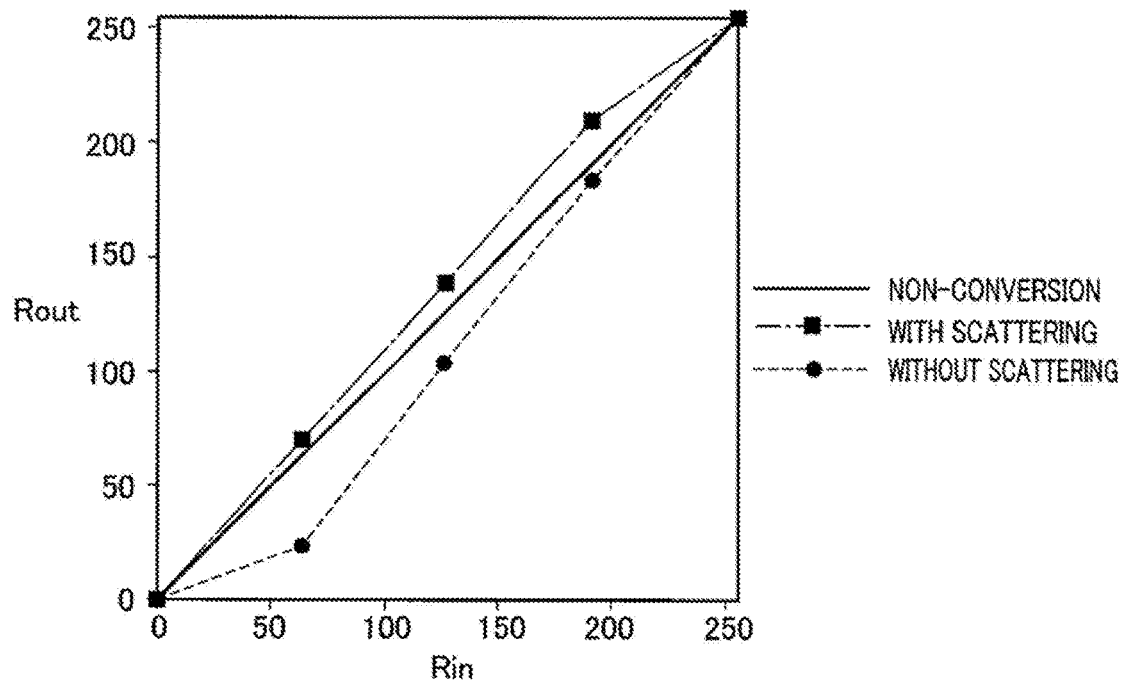
FIG. 3 is a characteristic diagram illustrating a conversion characteristic by an R signal conversion table for a mild-degree person with cataracts.
Figure 4:
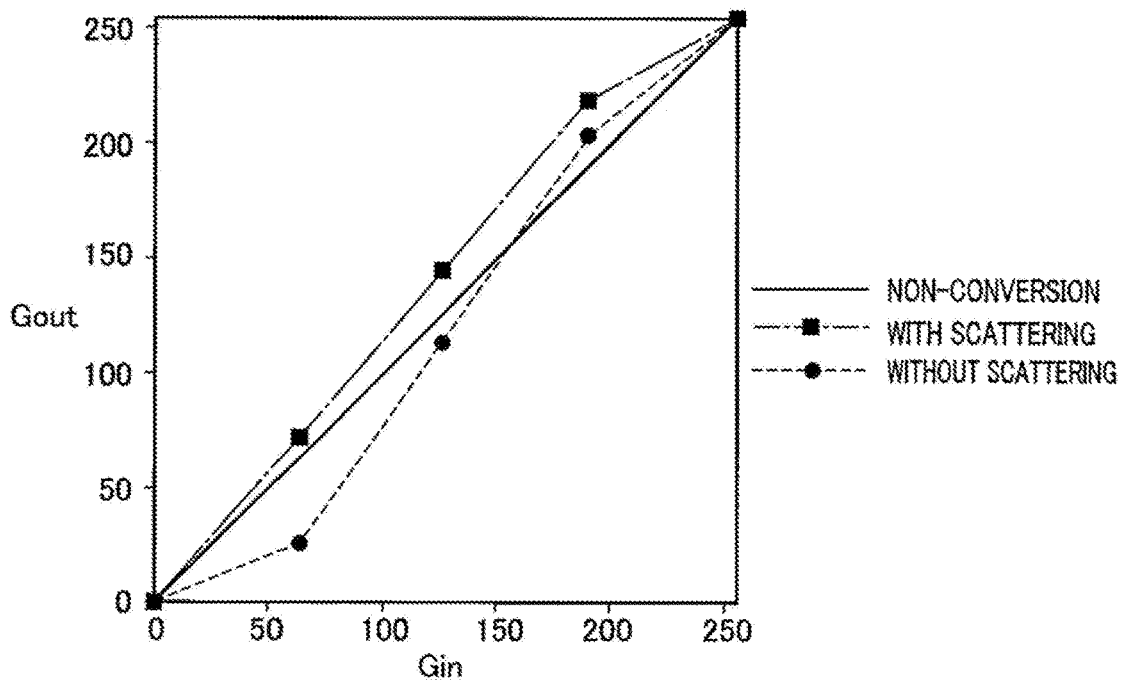
FIG. 4 is a characteristic diagram illustrating the conversion characteristic based on a G signal conversion table for a mild-degree person with cataracts.
Figure 5:
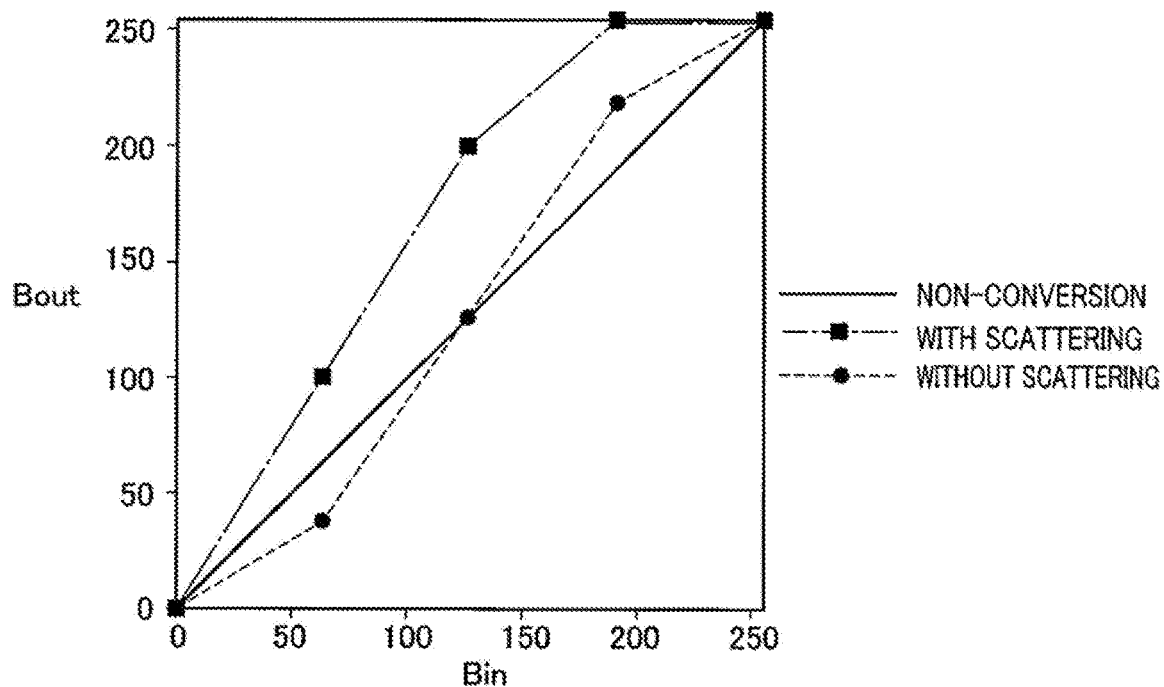
FIG. 5 is a characteristic diagram illustrating the conversion characteristic by a B signal conversion table for a mild-degree person with cataracts.

FIGS. 3 to 5 illustrate the conversion characteristics by the RGB signal conversion tables for a mild-degree person with cataracts. The one-dash chain line illustrated in FIG. 3 illustrates the conversion characteristic of the R signal by the conversion table TR01, and the dashed line illustrates the conversion characteristic of the R signal by the conversion table TR11. The output R signals Rout obtained by converting the input R signal Rin by the conversion tables TR01 and TR11 are expressed by the equations (1) and (2), respectively.

$$Rout = -0.0009 \times Rin^2 + 1.2579 \times Rin - 2.1774 \qquad (1)$$

$$Rout = 0.0016 \times Rin^2 + 0.6353 \times Rin - 7.2819 \qquad (2)$$

For a person with cataracts of a mild degree and without scattering, the RGB converter 11 increases the gradation values of the R signal more than a non-conversion linear characteristic from gradation value 0 which is the minimum gradation value of the input R signal Rin to gradation value 255 which is the maximum gradation value in its entirety, as illustrated by the one-dash chain line. The conversion characteristic expressed by the equation (1) has a slope more than 1 in gradation values 0 to 64, 64 to 127, and 127 to 191 of the input R signal Rin, and has a slope less than 1 in gradation values 191 to 255.

On the other hand, for a person with cataracts of a mild degree and with scattering, the RGB converter 11 decreases the gradation values of the R signal more than the non-conversion linear characteristic from gradation values 0 to 255 of the input R signal Rin in its entirety, as illustrated by the dashed line. The conversion characteristic expressed by the equation (2) has a slope significantly less than 1 in gradation values 0 to 64 of the input R signal Rin, and has a slope more than 1 in gradation values 64 to 127, 127 to 191, and 191 to 255.

Here, although persons with cataracts are divided into a person with cataracts without light scattering and a person with cataracts with light scattering, persons with cataracts having an intermediate degree of scattering also exist. Therefore, when the degree of scattering is set to three levels or more, the interpolation converter 12 preferably generates a conversion characteristic between the conversion characteristic expressed by the equation (1) and the conversion characteristic expressed by the equation (2) by interpolating the conversion characteristic. The interpolation converter 12 converts the input R signal Rin into the output R signal Rout based on the conversion characteristic generated by the interpolation. The interpolation converter 12 may convert the input R signal Rin into the output R signal Rout positioned between the conversion characteristic expressed by the equation (1) and the conversion characteristic expressed by the equation (2) according to the degree of scattering.

The one-dash chain line illustrated in FIG. 4 illustrates the conversion characteristic of the G signal by the conversion table TG01, and the dashed line illustrates the conversion characteristic of the G signal by the conversion table TG11. The output G signals Gout obtained by converting the input G signal Gin by the conversion tables TG01 and TG11 are expressed by the equations (3) and (4), respectively.

$$Gout = -0.0013 \times Gin^2 + 1.3508 \times Gin - 3.0924 \qquad (3)$$

$$Gout = 0.0009 \times Gin^2 + 0.8457 \times Gin - 10.3410 \qquad (4)$$

For a person with cataracts of a mild degree and without scattering, the RGB converter 11 increases the gradation values of the G signal more than the non-conversion linear characteristic from gradation values 0 to 255 of the input G signal in its entirety, as illustrated by the one-dash chain line. The conversion characteristic expressed by the equation (3) has a slope more than 1 in gradation values 0 to 64, 64 to 127, and 127 to 191 of the input G signal Gin, and has a slope less than 1 in gradation values 191 to 255. The slope from gradation values 0 to 191 in the conversion characteristic expressed by the equation (3) is larger than that in the conversion characteristic expressed by the equation (1).

On the other hand, for a person with cataracts of a mild degree and with scattering, the RGB converter 11 decreases the gradation values of the G signal more than the non-conversion linear characteristic in a range from gradation value 0 of the input G signal Gin to gradation value 170 or so which is a predetermined intermediate gradation value less than the maximum gradation value, as illustrated by the dashed line. In addition, the RGB converter 11 increases the gradation values of the G signal more than the linear characteristic in the range up to gradation value 255 beyond gradation value 170 or so.

The conversion characteristic expressed by the equation (4) has a slope significantly less than 1 in gradation values 0 to 64 of the input G signal Gin, has a slope more than 1 in gradation values 64 to 127 and 127 to 191, and has a slope less than 1 in gradation values 191 to 255. The slope from gradation values 64 to 191 in the conversion characteristic expressed by the equation (4) is larger than that in the conversion characteristic expressed by the equation (2).

Similarly, when the degree of scattering is set to three levels or more, the interpolation converter 12 preferably generates a conversion characteristic between the conversion characteristic expressed by the equation (3) and the conversion characteristic expressed by the equation (4) by interpolating the conversion characteristic. The interpolation converter 12 converts the input G signal Gin into the output G signal Gout based on the conversion characteristic generated by the interpolation. The interpolation converter 12 may convert the input G signal Gin into the output G signal Gout positioned between the conversion characteristic expressed by the equation (3) and the conversion characteristic expressed by the equation (4) according to the degree of scattering.

The one-dash chain line illustrated in FIG. 5 illustrates the conversion characteristic of the B signal by the conversion table TB01, and the dashed line illustrates the conversion characteristic of the B signal by the conversion table TB11. The output B signals Bout obtained by converting the input B signal Bin by the conversion tables TB01 and TB11 are expressed by the equations (5) and (6), respectively.

$$Bout=-0.0044 \times Bin^2 + 2.1688 \times Bin - 5.7943 \quad (5)$$

$$Bout=-0.0002 \times Bin^2 + 1.1236 \times Bin - 10.4670 \quad (6)$$

For a person with cataracts of a mild degree and without scattering, the RGB converter 11 increases the gradation values of the B signal more than the non-conversion linear characteristic from gradation values 0 to 255 of the input B signal in its entirety, as illustrated by the one-dash chain line.

The conversion characteristic expressed by the equation (5) has a slope significantly greater than 1 in gradation values 0 to 64 and 64 to 127 of the input B signal Bin. The conversion characteristic expressed by the equation (5) has a smaller slope in gradation values 127 to 191 than that in gradation values 64 to 127, has a slope of 0 in gradation values 191 to 255, and the output B signal Bout has a constant value of gradation value 255. The slope of gradation values 0 to 127 in the conversion characteristic expressed by the equation (5) is larger than that in the conversion characteristic expressed by the equation (3).

On the other hand, for a person with cataracts of a mild degree and with scattering, the RGB converter 11 decreases the gradation values of the B signal more than the non-conversion linear characteristic in a range from gradation value 0 of the input B signal Bin to gradation value 127 which is an intermediate gradation value, as illustrated by the dashed line. In addition, the RGB converter 11 increases the gradation values of the B signal more than the linear characteristic in the range up to gradation value 255 beyond gradation value 127.

The conversion characteristic expressed by the equation (6) has a slope less than 1 in gradation values 0 to 64 of the input B signal Bin, has a slope more than 1 in gradation values 64 to 127 and 127 to 191, and has a slope less than 1 in gradation values 191 to 255.

Similarly, when the degree of scattering is set to three levels or more, the interpolation converter 12 preferably generates a conversion characteristic between the conversion characteristic expressed by the equation (5) and the conversion characteristic expressed by the equation (6) by interpolating the conversion characteristic. The interpolation converter 12 converts the input B signal Bin into the output B signal Bout based on the conversion characteristic generated by the interpolation. The interpolation converter 12 may convert the input B signal Bin into the output B signal Bout positioned between the conversion characteristic expressed by the equation (5) and the conversion characteristic expressed by the equation (6) according to the degree of scattering.

Figure 6:
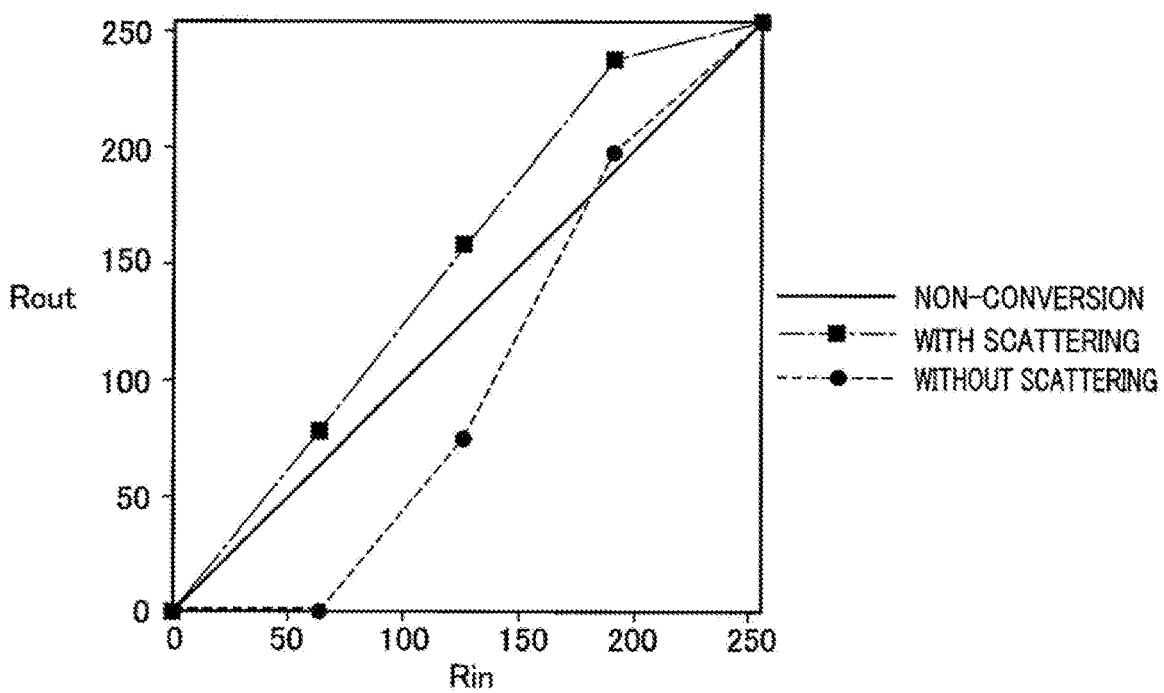
FIG. 6 is a characteristic diagram illustrating the conversion characteristic by an R signal conversion table for a moderate-degree person with cataracts.

FIGS. 6 to 9 illustrate the conversion characteristic by the RGB signal conversion table for a moderate-degree person with cataracts. The one-dash chain line illustrated in FIG. 6 illustrates the conversion characteristic of the R signal by the conversion table TR02, and the dashed line illustrates the conversion characteristic of the R signal by the conversion table TR12. The output R signals Rout obtained by converting the input R signal Rin by the conversion tables TR02 and TR12 are expressed by the equations (7) and (8), respectively.

$$Rout=-0.0022 \times Rin^2 + 1.6237 \times Rin - 5.4976 \quad (7)$$

$$Rout=0.0028 \times Rin^2 + 0.4091 \times Rin - 13.1520 \quad (8)$$

For a person with cataracts of a moderate degree and without scattering, the RGB converter 11 increases the gradation values of the R signal more than the non-conversion linear characteristic from gradation values 0 to 255 of the input R signal Rin in its entirety, as illustrated by the one-dash chain line.

The conversion characteristic expressed by the equation (7) has a slope more than 1 in gradation values 0 to 64, 64 to 127, and 127 to 191 of the input R signal Rin, and has a slope less than 1 in gradation values 191 to 255. The slope of the conversion characteristic expressed by the equation (7) in gradation values 0 to 191 is larger than that in the conversion characteristic expressed by the equation (1).

On the other hand, for a person with cataracts of a moderate degree and with scattering, the RGB converter 11 decreases the gradation values of the R signal more than the non-conversion linear characteristic in a range from gradation value 0 of the input R signal Rin to gradation value 180 or so which is an intermediate gradation value, as illustrated by the dashed line. In addition, the RGB converter 11 increases the gradation values of the R signal more than the linear characteristic in the range up to gradation value 255 beyond gradation value 180 or so.

The conversion characteristic expressed by the equation (8) is such that the slope is 0 in gradation values 0 to 64 of the input R signal Rin and the output R signal Rout has a constant value of gradation value 0. The conversion characteristic expressed by the equation (8) has a slope more than 1 in gradation values 64 to 127, the slope in gradation values 127 to 191 is larger than that in gradation values 64 to 127, and has a slope less than 1 in gradation values 191 to 255.

Similarly, when the degree of scattering is set to three levels or more, the interpolation converter 12 preferably generates a conversion characteristic between the conversion characteristic expressed by the equation (7) and the conversion characteristic expressed by the equation (8) by interpolating the conversion characteristic. The interpolation converter 12 converts the input R signal Rin into the output R signal Rout based on the conversion characteristic generated by the interpolation. The interpolation converter 12 may convert the input R signal Rin into the output R signal Rout positioned between the conversion characteristic expressed by the equation (7) and the conversion characteristic expressed by the equation (8) according to the degree of scattering.

Figure 7:
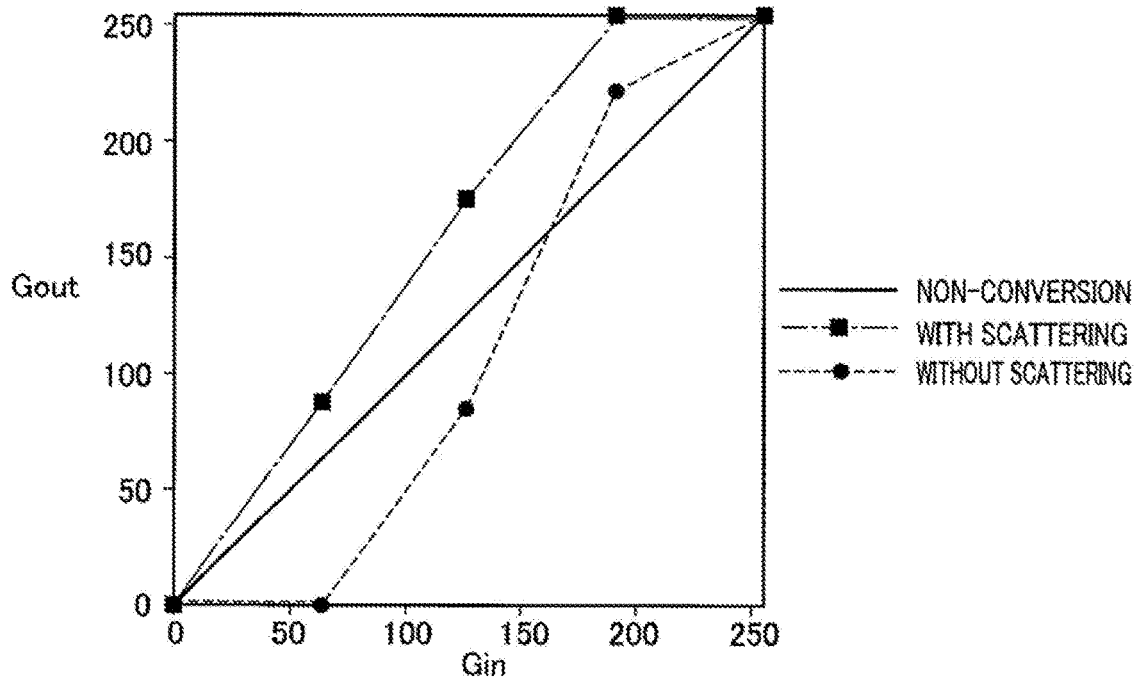
FIG. 7 is a characteristic diagram illustrating the conversion characteristic by a G signal conversion table for a moderate-degree person with cataracts.

The one-dash chain line illustrated in FIG. 7 illustrates the conversion characteristic of the G signal by the conversion table TG02, and the dashed line illustrates the conversion characteristic of the G signal by the conversion table TG12. The output G signals Gout obtained by converting the input G signal Gin by the conversion tables TG02 and TG12 are expressed by the equations (9) and (10), respectively.

$$Gout=-0.0034 \times Bin^2+1.9285 \times Bin-6.9237 \quad (9)$$

$$Gout=0.0020 \times Bin^2+0.6501 \times Bin-17.5830 \quad (10)$$

For a person with cataracts of a moderate degree and without scattering, the RGB converter 11 increases the gradation values of the G signal more than the non-conversion linear characteristic from gradation values 0 to 255 of the input G signal Gin in its entirety, as illustrated by the one-dash chain line. The conversion characteristic expressed by the equation (9) has a slope significantly greater than 1 in gradation values 0 to 64, 64 to 127, and 127 to 191 of the input G signal Gin, and has a slope of 0 in gradation values 191 to 255, and the output G signal Gout has a constant value of gradation value 255. The slope of gradation values 0 to 191 in the conversion characteristic expressed by the equation (9) is larger than that in the conversion characteristic expressed by the equation (7).

On the other hand, for a person with cataracts of a moderate degree and with scattering, the RGB converter 11 decreases the gradation values of the G signal more than the non-conversion linear characteristic in a range from gradation value 0 of the input G signal Gin to gradation value 150 or so which is an intermediate gradation value, as illustrated by the dashed line. In addition, the RGB converter 11 increases the gradation values of the G signal more than the linear characteristic in the range up to gradation value 255 beyond gradation value 150 or so.

The conversion characteristic expressed by the equation (10) is such that the slope is 0 in gradation values 0 to 64 of the input G signal Gin and the output G signal Gout has a constant value of gradation value 0. The conversion characteristic expressed by the equation (10) has a slope more than 1 in gradation values 64 to 127, the slope in gradation values 127 to 191 is larger than that in gradation values 64 to 127, and has a slope less than 1 in gradation values 191 to 255.

Similarly, when the degree of scattering is set to three levels or more, the interpolation converter 12 preferably generates a conversion characteristic between the conversion characteristic expressed by the equation (9) and the conversion characteristic expressed by the equation (10) by interpolating the conversion characteristic. The interpolation converter 12 converts the input G signal Gin into the output G signal Gout based on the conversion characteristic generated by the interpolation. The interpolation converter 12 may convert the input G signal Gin into the output G signal Gout positioned between the conversion characteristic expressed by the equation (9) and the conversion characteristic expressed by the equation (10) according to the degree of scattering.

Figure 8:
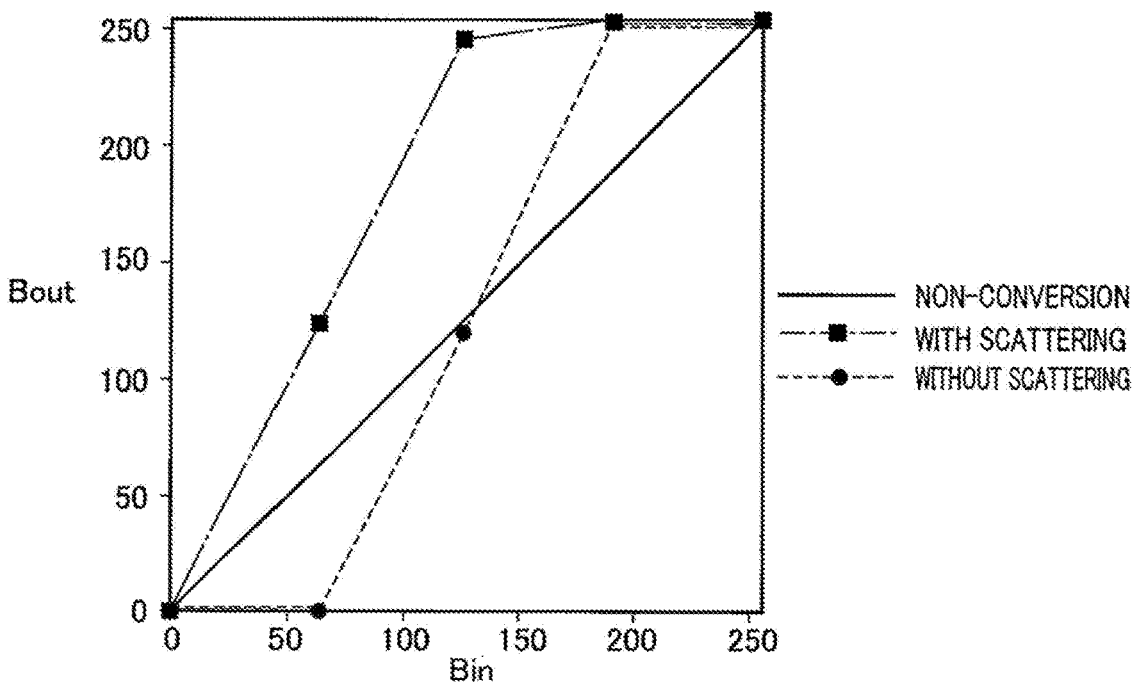
FIG. 8 is a characteristic diagram illustrating the conversion characteristic by a B signal conversion table for a moderate-degree person with cataracts.

The one-dash chain line illustrated in FIG. 8 illustrates the conversion characteristic of the B signal by the conversion table TB02, and the dashed line illustrates the conversion characteristic of the B signal by the conversion table TB12. The output B signals Bout obtained by converting the input B signal Bin by the conversion tables TB02 and TB12 are expressed by the equations (11) and (12), respectively.

$$Bout=-0.0065 \times Bin^2+2.6584 \times Bin-3.6196 \quad (11)$$

$$Bout=0.0002 \times Bin^2+1.1566 \times Bin-25.1270 \quad (12)$$

For a person with cataracts of a moderate degree and without scattering, the RGB converter 11 increases the gradation values of the B signal more than the non-conversion linear characteristic from gradation values 0 to 255 of the input B signal Bin in its entirety, as illustrated by the one-dash chain line.

The conversion characteristic expressed by the equation (11) has a slope significantly greater than 1 in gradation values 0 to 64 and 64 to 127 of the input B signal Bin, has a slope significantly less than 1 in gradation values 127 to 191, has a slope of 0 in gradation values 191 to 255, and the output B signal Bout has a constant value of gradation value 255. The slope of gradation values 0 to 127 in the conversion characteristic expressed by the equation (11) is larger than that in the conversion characteristic expressed by the equation (9).

On the other hand, for a person with cataracts of a moderate degree and with scattering, the RGB converter 11 decreases the gradation values of the R signal more than the non-conversion linear characteristic in a range from gradation value 0 of the input B signal Bin to an intermediate gradation value which is gradation value 130 or so, as illustrated by the dashed line. In addition, the RGB converter 11 increases the gradation values of the R signal more than the linear characteristic in the range up to gradation value 255 beyond gradation value 130 or so.

The conversion characteristic expressed by the equation (12) is such that the slope is 0 in gradation values 0 to 64 of the input B signal Bin and the output B signal Bout has a constant value of gradation value 0. The conversion characteristic expressed by the equation (12) has a slope significantly greater than 1 in gradation values 64 to 127 and 127 to 191, the slope is 0 in gradation values 191 to 255, and the output B signal Bout has a constant value of gradation value 255.

Similarly, when the degree of scattering is set to three levels or more, the interpolation converter 12 preferably generates a conversion characteristic between the conversion characteristic expressed by the equation (11) and the conversion characteristic expressed by the equation (12) by interpolating the conversion characteristic. The interpolation converter 12 converts the input B signal Bin into the output B signal Bout based on the conversion characteristic generated by the interpolation. The interpolation converter 12 may convert the input B signal Bin into the output B signal Bout positioned between the conversion characteristic expressed by the equation (11) and the conversion characteristic expressed by the equation (12) according to the degree of scattering.

Figure 9:
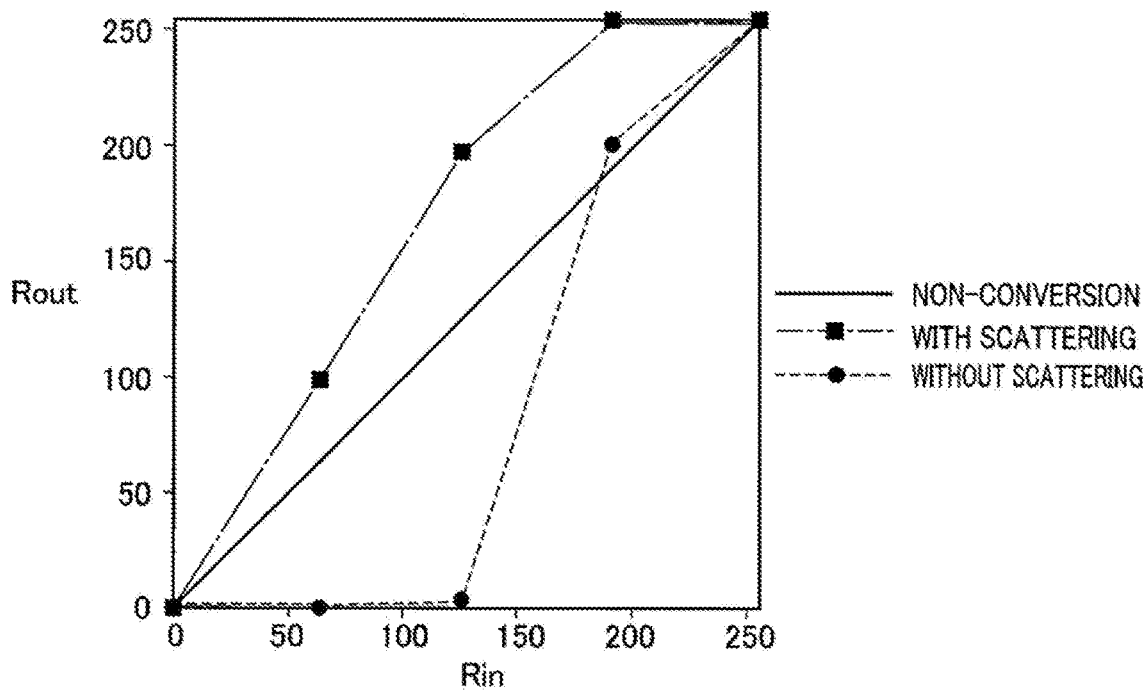
FIG. 9 is a characteristic diagram illustrating the conversion characteristic by an R signal conversion table for a severe-degree person with cataracts.
Figure 10:
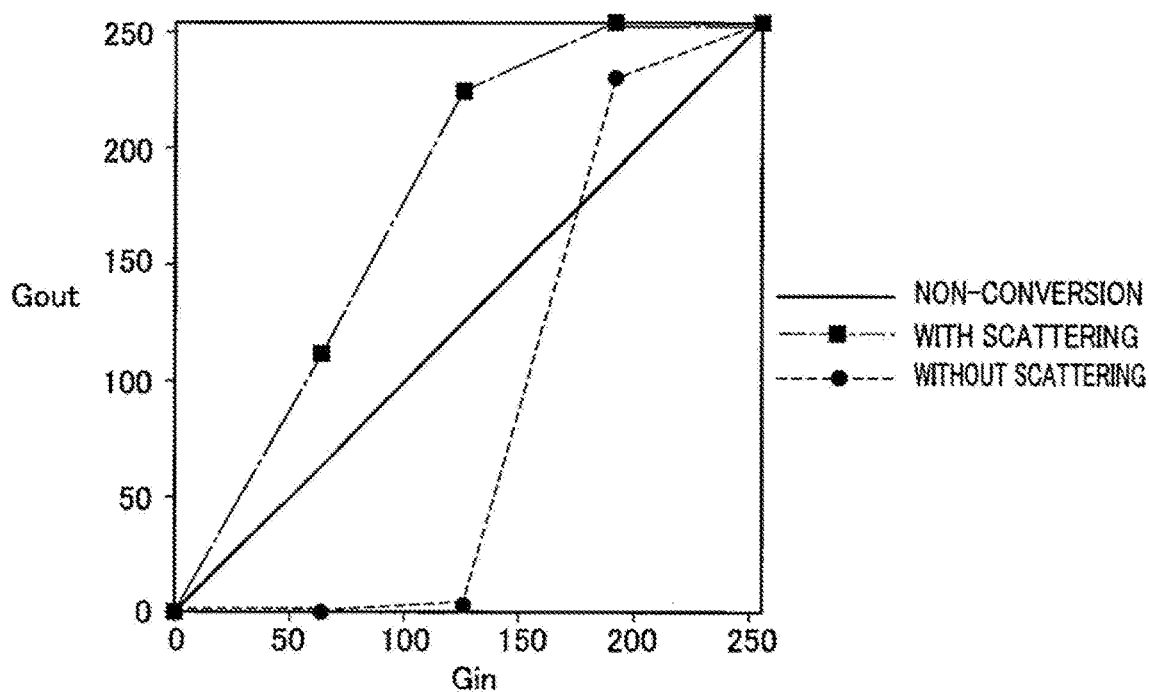
FIG. 10 is a characteristic diagram illustrating the conversion characteristic based on a G signal conversion table for a severe-degree person with cataracts.
Figure 11:
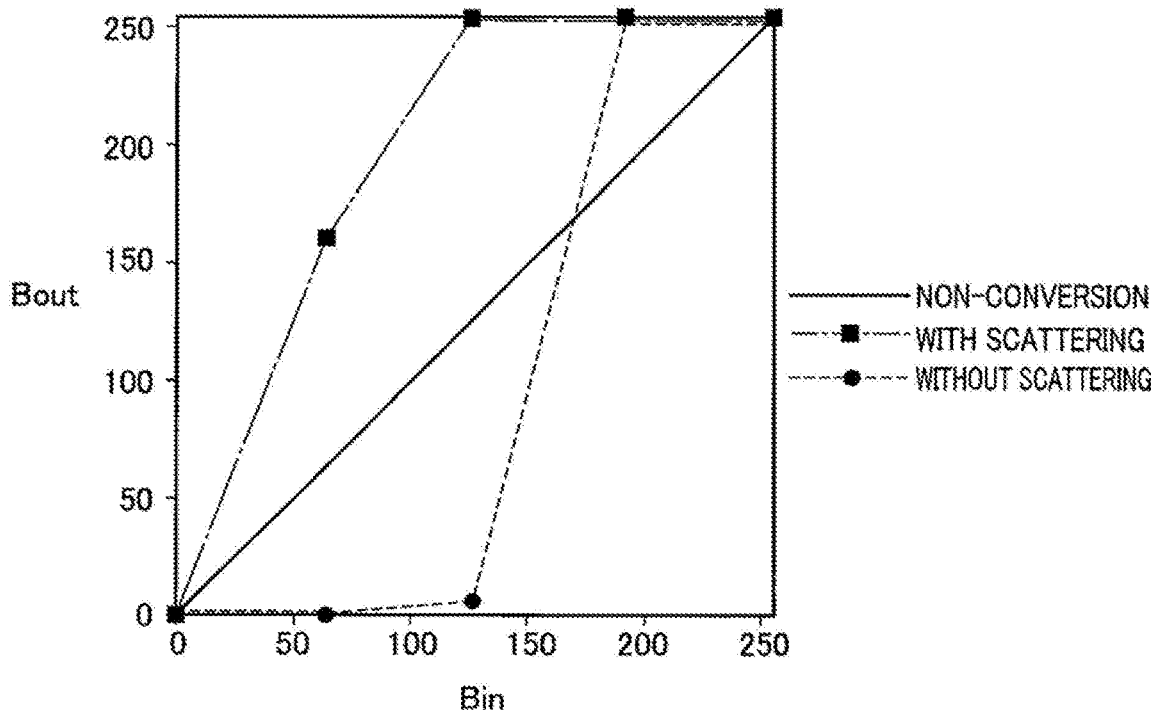
FIG. 11 is a characteristic diagram illustrating the conversion characteristic by a B signal conversion table for a severe-degree person with cataracts.

FIGS. 9 to 11 illustrate the conversion characteristic by the RGB signal conversion table for a severe-degree person with cataracts. The one-dash chain line illustrated in FIG. 9 illustrates the conversion characteristic of the R signal by the conversion table TR03, and the dashed line illustrates the conversion characteristic of the R signal by the conversion table TR13. The output R signals Rout obtained by converting the input R signal Rin by the conversion tables TR02 and TR12 are expressed by the equations (13) and (14), respectively.

$$Rout = -0.0043 \times Rin^2 + 2.1480 \times Rin - 5.8814 \quad (13)$$

$$Rout = 0.0053 \times Rin^2 + 0.2269 \times Rin - 7.4907 \quad (14)$$

For a person with cataracts of a severe degree and without scattering, the RGB converter 11 increases the gradation values of the R signal more than the non-conversion linear characteristic from gradation values 0 to 255 of the input R signal Rin in its entirety, as illustrated by the one-dash chain line. The conversion characteristic expressed by the equation (13) has a slope significantly greater than 1 in gradation values 0 to 64 and 64 to 127 of the input R signal Rin. The conversion characteristic expressed by the equation (13) has a smaller slope in gradation values 127 to 191 than that in gradation values 64 to 127, has a slope of 0 in gradation values 191 to 255, and the output R signal Rout has a constant value of gradation value 255.

The slope in gradation values 0 to 127 in the conversion characteristic expressed by the equation (13) is larger than that in the conversion characteristic expressed by the equation (7).

On the other hand, for a person with cataracts of a severe degree and with scattering, the RGB converter 11 decreases the gradation values of the R signal more than the non-conversion linear characteristic in a range from gradation value 0 of the input R signal Rin to gradation value 180 or so which is an intermediate gradation value, as illustrated by the dashed line. In addition, the RGB converter 11 increases the gradation values of the R signal more than the linear characteristic in the range up to gradation value 255 beyond gradation value 180 or so.

The conversion characteristic expressed by the equation (14) is such that the slope is 0 in gradation values 0 to 64 of the input R signal Rin and the output R signal Rout has a constant value of gradation value 0. The conversion characteristic illustrated by the equation (14) has a small slope close to 0 in gradation values 64 to 127, has a slope significantly greater than 1 in gradation values 127 to 191, and has a slope less than 1 in gradation values 191 to 255.

Similarly, when the degree of scattering is set to three levels or more, the interpolation converter 12 preferably generates a conversion characteristic between the conversion characteristic expressed by the equation (13) and the conversion characteristic expressed by the equation (14) by interpolating the conversion characteristic. The interpolation converter 12 converts the input R signal Rin into the output R signal Rout based on the conversion characteristic generated by the interpolation. The interpolation converter 12 may convert the input R signal Rin into the output R signal Rout positioned between the conversion characteristic expressed by the equation (13) and the conversion characteristic expressed by the equation (14) according to the degree of scattering.

The one-dash chain line illustrated in FIG. 10 illustrates the conversion characteristic of the G signal by the conversion table TG03, and the dashed line illustrates the conversion characteristic of the G signal by the conversion table TG13. The output G signals Gout obtained by converting the input G signal Gin by the conversion tables TG03 and TG13 are expressed by the equations (15) and (16), respectively.

$$Gout = 0.0047 \times Gin^2 + 0.0299 \times Gin - 12.0260 \quad (15)$$

$$Gout = -0.0057 \times Gin^2 + 2.4596 \times Gin - 4.5749 \quad (16)$$

For a person with cataracts of a severe degree and without scattering, the RGB converter 11 increases the gradation values of the G signal more than the non-conversion linear characteristic from gradation values 0 to 255 of the input G signal Gin in its entirety, as illustrated by the one-dash chain line. The conversion characteristic expressed by the equation (15) has a slope significantly greater than 1 in gradation values 0 to 64 and 64 to 127 of the input G signal Gin, has a slope less than 1 in gradation values 127 to 191, the slope is 0 in gradation values 191 to 255, and the output G signal Gout has a constant value of gradation values 255.

The slope in gradation values 0 to 127 in the conversion characteristic expressed by the equation (15) is larger than that in the conversion characteristic expressed by the equation (9).

On the other hand, for a person with cataracts of a severe degree and with scattering, the RGB converter 11 decreases the gradation values of the G signal more than the non-conversion linear characteristic in a range from gradation value 0 of the input G signal Gin to gradation value 170 or so which is an intermediate gradation value, as illustrated by the dashed line. In addition, the RGB converter 11 increases the gradation values of the G signal more than the linear characteristic in the range up to gradation value 255 beyond gradation value 170 or so.

The conversion characteristic expressed by the equation (16) is such that the slope is 0 in gradation values 0 to 64 of the input G signal Gin and the output G signal Gout has a constant value of gradation value 0. The conversion characteristic illustrated by the equation (16) has a small slope close to 0 in gradation values 64 to 127, has a slope significantly greater than 1 in gradation values 127 to 191, and has a slope less than 1 in gradation values 191 to 255.

Similarly, when the degree of scattering is set to three levels or more, the interpolation converter 12 preferably generates a conversion characteristic between the conversion characteristic expressed by the equation (15) and the conversion characteristic expressed by the equation (16) by interpolating the conversion characteristic. The interpolation converter 12 converts the input G signal Gin into the output G signal Gout based on the conversion characteristic generated by the interpolation. The interpolation converter 12 may convert the input G signal Gin into the output G signal Gout positioned between the conversion characteristic expressed by the equation (15) and the conversion characteristic expressed by the equation (16) according to the degree of scattering.

The one-dash chain line illustrated in FIG. 11 illustrates the conversion characteristic of the B signal by the conversion table TB03, and the dashed line illustrates the conversion characteristic of the B signal by the conversion table TB13. The output B signals Bout obtained by converting the input B signal Bin by the conversion tables TB03 and TB13 are expressed by the equations (17) and (18), respectively.

$$Bout=-0.0074\times Bin^2+2.8202\times Bin-5.3328 \quad (17)$$

$$Bout=0.0043\times Bin^2+0.1126\times Bin-15.2680 \quad (18)$$

For a person with cataracts of a severe degree and without scattering, the RGB converter 11 increases the gradation values of the B signal more than the non-conversion linear characteristic from gradation values 0 to 255 of the input B signal Bin in its entirety, as illustrated by the one-dash chain line. The conversion characteristic expressed by the equation (17) has a slope significantly greater than 1 in gradation values 0 to 64, has a slope greater than 1 in gradation values 64 to 127 and smaller than the slope in gradation values 0 to 64, has a slope of 0 in gradation values 127 to 255, and the output B signal Bout has a constant value of gradation value 255.

The slope in gradation values 0 to 127 in the conversion characteristic expressed by the equation (17) is larger than that in the conversion characteristic expressed by the equation (11).

On the other hand, for a person with cataracts of a severe degree and with scattering, the RGB converter 11 decreases the gradation values of the B signal more than the non-conversion linear characteristic in a range from gradation value 0 of the input B signal Bin to gradation value 170 or so which is an intermediate gradation value, as illustrated by the dashed line. In addition, the RGB converter 11 increases the gradation values of the B signal more than the linear characteristic in the range up to gradation value 255 beyond gradation value 170 or so.

The conversion characteristic expressed by the equation (18) is such that the slope is 0 in gradation values 0 to 64 of the input B signal Bin and the output B signal Bout has a constant value of gradation value 0. The conversion characteristic illustrated by the equation (18) has a small slope close to 0 in gradation values 64 to 127, has a slope significantly greater than 1 in gradation values 127 to 191, the slope is 0 in gradation values 191 to 255, and the output B signal Bout has a constant value of gradation 255.

Similarly, when the degree of scattering is set to three levels or more, the interpolation converter 12 preferably generates a conversion characteristic between the conversion characteristic expressed by the equation (17) and the conversion characteristic expressed by the equation (18) by interpolating the conversion characteristic. The interpolation converter 12 converts the input B signal Bin into the output B signal Bout based on the conversion characteristic generated by the interpolation. The interpolation converter 12 may convert the input B signal Bin into the output B signal Bout positioned between the conversion characteristic expressed by the equation (17) and the conversion characteristic expressed by the equation (18) according to the degree of scattering.

With the conversion characteristics illustrated in FIGS. 3 to 11 as described above, the RGB converter 11 converts the gradation values of the input R signal Rin, the input G signal Gin, and the input B signal Bin as follows to generate the output R signal Rout, the output G signal Gout, and the output B signal Bout.

The RGB converter 11 uses the linear characteristic that does not convert the output R signal Rout, the output G signal Gout, and the output B signal Bout with respect to the input R signal Rin, the input G signal Gin, and the input B signal Bin as a reference. When it is designated that it is a cataract with light scattering by the cataract degree designating signal, the RGB converter 11 decreases the gradation values of the input R signal Rin, the input G signal Gin, and the input B signal Bin with the first conversion characteristic in the range from the minimum gradation value to the intermediate gradation value with the linear characteristic as a reference.

When it is designated that it is a cataract without light scattering by the cataract degree designating signal, the RGB converter 11 increases the gradation values of the input R signal Rin, the input G signal Gin, and the input B signal Bin with the second conversion characteristic in the entire range from the minimum gradation value to the maximum gradation value with the linear characteristic as a reference that does not convert gradation values.

As the first conversion characteristic, the RGB converter 11 desirably increases the degree to which the gradation values of the input R signal Rin, the input G signal Gin, and the input B signal Bin are decreased as the degree of cataract becomes severe according to the degree of cataract indicated by the cataract degree designating signal.

A video image viewed by a person with cataracts with scattering is whitish due to light scattering. By decreasing the gradation values of the input R signal Rin, the input G signal Gin, and the input B signal Bin with the first conversion characteristic, it is possible to reduce whiteness and bring the video image closer to the video image viewed by a person with normal sight. As the degree of cataract becomes severe, the video image becomes more whitish, and thus it is possible to bring the video image closer to that viewed by the person with normal sight by increasing the degree to which gradation values is reduced as the degree of cataract becomes severe.

As illustrated in FIG. 3, as the first conversion characteristic, the RGB converter 11 desirably decreases the gradation values of the input R signal Rin in the entire range from the minimum gradation value to the maximum gradation value when the degree of cataract is milder than a predetermined degree. As illustrated in FIGS. 6 and 9, as the first conversion characteristic, the RGB converter 11 desirably increases the gradation values of the input R signal Rin in the range up to the maximum gradation value beyond the intermediate gradation value when the degree of cataract is equal to or greater than the predetermined degree.

As illustrated in FIGS. 4, 5, 7, 8, 10, and 11, as the first conversion characteristic, the RGB converter 11 desirably increases the gradation values of the input G signal Gin and the input B signal Bin in the range up to the maximum gradation value beyond the intermediate gradation value.

As the first conversion characteristic, the RGB converter 11 desirably sets the degree to which the gradation values of the input G signal Gin is decreased to be less than the degree to which the gradation values of the input R signal Rin is decreased, and desirably sets the degree to which the gradation values of the input B signal Bin is decreased to be less than the degree to which the gradation values of the input G signal Gin is decreased. This can be understood by comparing FIG. 3, FIG. 6, and FIG. 9, comparing FIG. 4, FIG. 7, and FIG. 10, and comparing FIG. 5, FIG. 8, and FIG. 11.

As described above, the video image viewed by the person with cataracts is yellowish, it is possible to bring the video image closer to the video image viewed by the person with normal sight by reducing a ratio of the yellow component, by setting the way to decrease the gradation values of the input R signal Rin, the input G signal Gin, and the input B signal Bin as the relationship described above.

The RGB converter 11 preferably includes the interpolation converter 12 that interpolates and converts the gradation values of the input R signal Rin, the input G signal Gin, and the input B signal Bin so as to have a conversion characteristic between the first conversion characteristic and the second conversion characteristic according to the degree of light scattering. If the RGB converter 11 includes the interpolation converter 12, it can be converted into the optimum output R signal Rout, output G signal Gout, and output B signal Bout according to the degree of light scattering only by holding the conversion tables of two conversion characteristics in the conversion table holding unit 13. The same applies to the case where a conversion formula holding unit for holding conversion formulas representing two conversion characteristics is provided instead of the conversion table holding unit 13.

The present inventor has confirmed by the following verifications that the conversion characteristics illustrated in FIGS. 3 to 11 can bring the video image viewed by a person with cataracts to be nearly equal to the video image viewed by a person with normal sight. A person with cataracts undergoes cataract surgery for each eye. The person with cataracts who has undergone surgery for cataract only in one eye views the video image of the output R signal Rout, the output G signal Gout, and the output B signal Bout with one eye not undergoing surgery, and views the video image of the output R signal Rout, the output G signal Gout, and the output B signal Bout with one eye that has undergone surgery, and compares the two.

If there is no great difference between the two, it can be determined that the video image viewed by the person with cataracts is almost the same as the video image viewed by the person with normal sight. The present inventor has confirmed the effect of the present embodiment through verification by a plurality of persons with cataracts having different degrees of cataract.

The video signal conversion device 1 in FIG. 1 may be configured by hardware such as a circuit, or may be configured by software (a computer program). The video signal conversion device 1 may be configured by mixing hardware and software.

Figure 12:
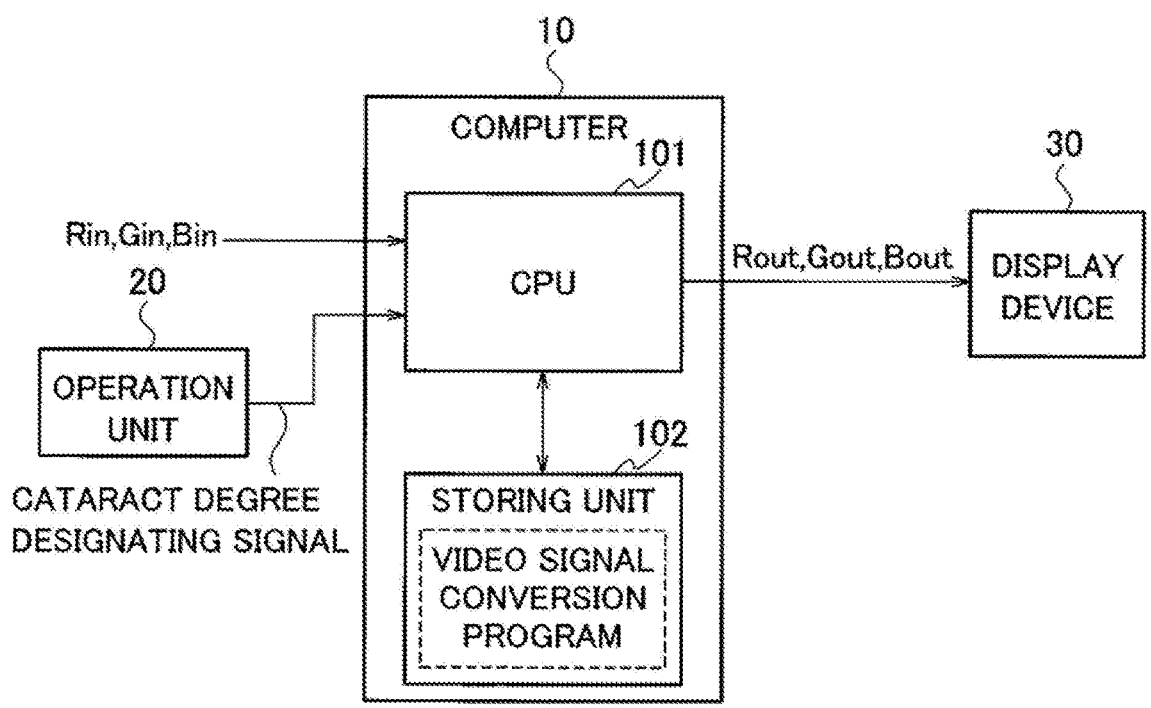
FIG. 12 is a block diagram illustrating a configuration example of a computer that executes a video signal conversion program according to an embodiment.

As illustrated in FIG. 12, a computer 10 can be made to function as a video signal conversion device by a central processing unit 101 (hereinafter, CPU 101) of the computer 10 executing the video signal conversion program of the present embodiment. The video signal conversion program is stored in a storing unit 102. The storing unit 102 is any non-transitory storage medium such as a semiconductor memory, an optical disc, or a hard disk. The storing unit 102 is a ROM, and the video signal conversion program read from the storing unit 102 may be loaded into an unillustrated RAM and executed by the CPU 101.

The operation unit 20 is a keyboard or a mouse connected to the computer 10. A display device 30 is connected to the computer 10.

In FIG. 12, an R signal Rin, a G signal Gin, and a B signal Bin are input to the CPU 101. A person with cataracts operates the operation unit 20 to supply the CPU 101 with a cataract degree designating signal for selecting the degree of light scattering and the degree of cataract. The CPU 101 executes the video signal conversion program to convert the input R signal Rin, the input G signal Gin, and the input B signal Bin into the output R signal Rout, the output G signal Gout, and the output B signal Bout. The output R signal Rout, the output G signal Gout, and the output B signal Bout are supplied to the display device 30 to display a video image.

The operation of the video signal conversion device 1 illustrated in FIG. 1, the video signal conversion method executed by the video signal conversion device 1, and a process executed by the CPU 101 based on the video signal conversion program will be described using a flowchart illustrated in FIG. 13.

Figure 13:
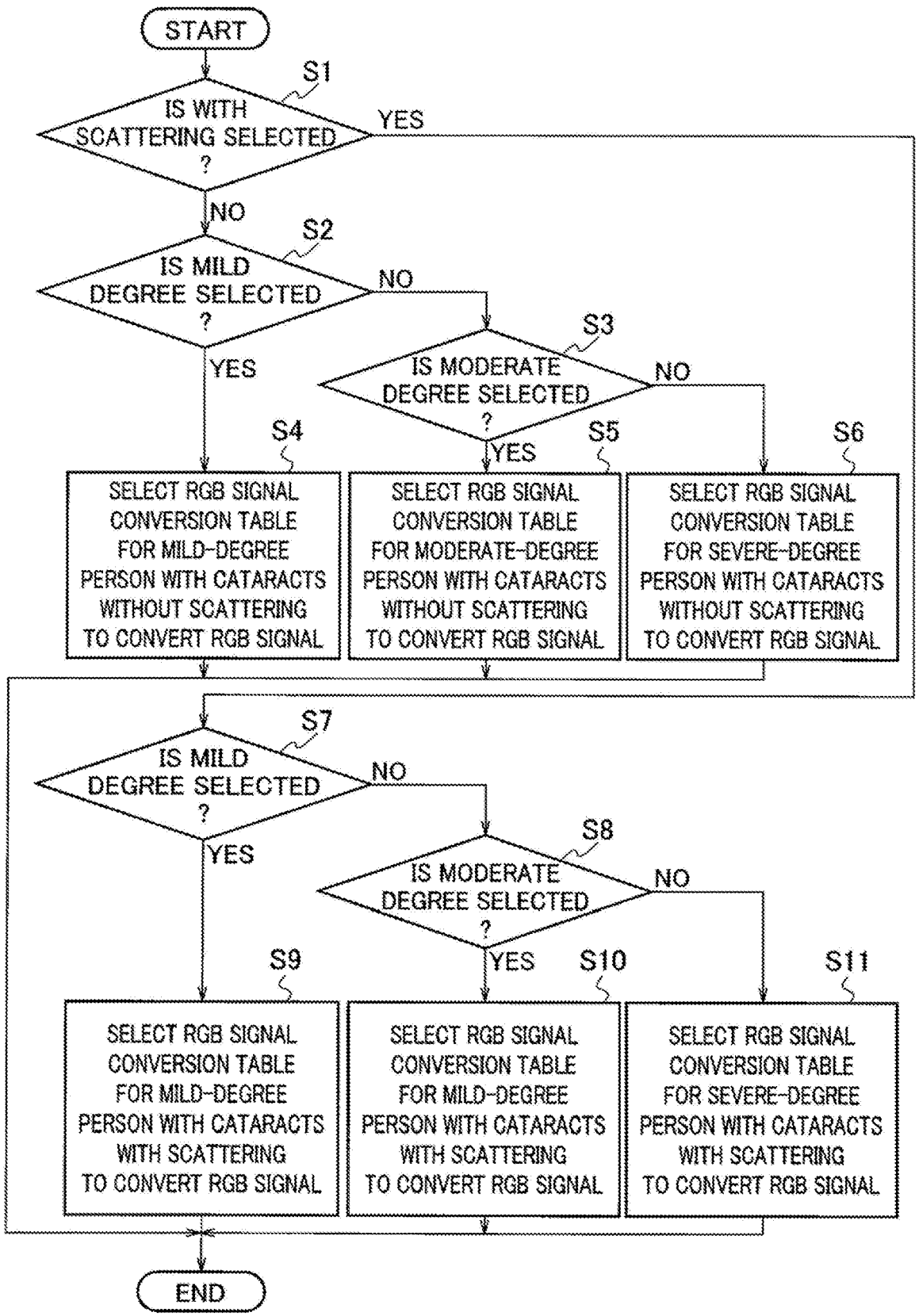
FIG. 13 is a flowchart illustrating an operation of the video signal conversion device according to an embodiment, and processes executed by a video signal conversion method and video signal conversion program according to an embodiment.

In FIG. 13, the RGB converter 11 (CPU 101) determines whether or not "with scattering" is selected as the degree of cataract, in step S1. Step S1 is a receiving step of receiving the cataract degree designating signal. When "with scattering" is not selected (NO), the RGB converter 11 (CPU 101) determines whether or not a mild degree is selected as the degree of cataract, in step S2.

When the mild degree is selected (YES), the RGB converter 11 (CPU 101) selects the R signal conversion table TR01, the G signal conversion table TG01, and the B signal conversion table TB01 for the person with cataracts of a mild degree and without scattering, in step S4. The RGB converter 11 (CPU 101) converts the input R signal Rin, the input G signal Gin, and the input B signal Bin using the RGB conversion tables for the mild-degree person with cataracts without scattering, and ends the process.

When the mild degree is not selected in step S2 (NO), the RGB converter 11 (CPU 101) determines whether or not a moderate degree is selected as the degree of cataract, in step S3. When the moderate degree is selected (YES), the RGB converter 11 (CPU 101) selects the R signal conversion table TR02, the G signal conversion table TG02, and the B signal conversion table TB02 for the person with cataracts of a moderate degree and without scattering, in step S5. The RGB converter 11 (CPU 101) converts the input R signal Rin, the input G signal Gin, and the input B signal Bin using the RGB conversion tables for the person with moderate cataract without scattering, and ends the process.

When the moderate degree is not selected in step S3 (NO), the RGB converter 11 (CPU 101) selects the R signal conversion table TR03, the G signal conversion table TG03, the B signal conversion table TB03 for a person with cataracts of a severe degree and without scattering, in step S6. The RGB converter 11 (CPU 101) converts the input R signal Rin, the input G signal Gin, and the input B signal Bin using the RGB conversion tables for the person with cataracts of a severe degree and without scattering, and ends the process. Steps S4 to S6 are generation steps for generating the output R signal, the output G signal, and the output B signal.

On the other hand, when with scattering is selected in step S1 (YES), the RGB conversion section 11 (CPU 101) determines whether or not a mild degree is selected as the degree of cataract, in step S7.

When the mild degree is selected (YES), the RGB converter 11 (CPU 101) selects the R signal conversion table TR11, the G signal conversion table TG11, and the B signal conversion table TB11 for the person with cataracts of a mild degree and with scattering, in step S9. The RGB converter 11 (CPU 101) converts the input R signal Rin, the input G signal Gin, and the input B signal Bin using the RGB conversion tables for the person with cataracts of a mild degree and with scattering, and ends the process.

When the mild degree is not selected in step S7 (NO), the RGB converter 11 (CPU 101) determines whether or not the moderate degree is selected as the degree of cataract, in step S8. When the moderate degree is selected (YES), the RGB converter 11 (CPU 101) selects the R signal conversion table TR12, the G signal conversion table TG12, and the B signal conversion table TB12 for the person with cataracts of a moderate degree and with scattering, in step S10. The RGB converter 11 (CPU 101) converts the input R signal Rin, the input G signal Gin, and the input B signal Bin using the RGB conversion tables for the person with cataracts of a moderate degree and with scattering, and ends the process.

When the moderate degree is not selected in step S8 (NO), the RGB converter 11 (CPU 101) selects the R signal conversion table TR13, the G signal conversion table TG13, the B signal conversion table TB13 for the person with cataracts of a severe degree and with scattering, in step S11. The RGB converter 11 (CPU 101) converts the input R signal Rin, the input G signal Gin, and the input B signal Bin using the RGB conversion tables for the severe-degree person with cataracts with scattering, and ends the process. Steps S9 to S11 are generation steps for generating the output R signal, the output G signal, and the output B signal.

Although illustration is omitted in FIG. 13, it is preferable that the interpolation converter 12 execute an interpolation conversion step in which the gradation values of the input R signal, the input G signal, and the input B signal is interpolated and converted so as to have a conversion characteristic between the first conversion characteristic and the second conversion characteristic, according to the degree of light scattering.

As described above, in accordance with the video signal conversion device, the video signal conversion method, and the video signal conversion program according to the present embodiment, the video image viewed by the person with cataracts can be brought closer to the video image viewed by the person with normal sight in consideration of the degree of light scattering.

The present invention is not limited to the present embodiment described above, and various modifications may be made without departing from the scope of the present invention. The conversion table holding unit 13 is illustrated to have a configuration illustrated in FIG. 2 including both the conversion tables for a person with cataracts without scattering and the conversion tables for a person with cataracts with scattering, but may have a configuration including only the conversion tables for a person with cataracts with scattering. That is, the video signal conversion device, the video signal conversion method, and the video signal conversion program according to the present embodiment may be configured to bring the video image viewed by the person with cataracts closer to the video image viewed by the person with normal sight with only a person with cataracts with light scattering as a target.

The disclosure of the present application relates to the subject matter described in Japanese Patent Application No. 2018-082950, filed on Apr. 24, 2018, the entire contents of which are incorporated herein by reference.

The invention claimed is:

1. A video signal conversion device comprising:
an RGB converter configured to convert gradation values of an input R signal, an input G signal, and an input B signal of three primary colors based on a conversion table or a conversion formula to generate an output R signal, an output G signal, and an output B signal, wherein
when it is designated, by a cataract degree designating signal that designates a degree of cataract including a degree of light scattering, that it is a cataract with light scattering,
the RGB converter decreases the gradation values of the input R signal, the input G signal, and the input B signal, in a range from a minimum gradation value to a predetermined intermediate gradation value less than a maximum gradation value, with a linear characteristic of not converting gradation values of the output R signal, the output G signal, and the output B signal as a reference with respect to the gradation values of the input R signal, the input G signal, and the input B signal.

2. The video signal conversion device according to claim 1, wherein
the RGB converter increases a degree to which gradation values of the input R signal, the input G signal, and the input B signal are decreased as the degree of cataract becomes severe according to the degree of cataract indicated by the cataract degree designating signal.

3. The video signal conversion device according to claim 2, wherein
the RGB converter
decreases the gradation values of the input R signal in an entire range from the minimum gradation value to the maximum gradation value when the degree of cataract is milder than a predetermined degree, and
increases the gradation values of the input R signal in a range up to the maximum gradation value beyond the intermediate gradation value with the linear characteristic as a reference when the degree of cataract is severe to be equal to or greater than the predetermined degree.

4. The video signal conversion device according to claim 1, wherein
the RGB converter increases the gradation values of the input G signal and the input B signal in a range up to the maximum gradation value beyond the intermediate gradation value with the linear characteristic as a reference.

5. The video signal conversion device according to claim 1, wherein
the RGB converter
sets the degree to which the gradation values of the input G signal are decreased to be equal to or less than the degree to which the gradation values of the input R signal are decreased, and
sets the degree to which the gradation values of the input B signal are decreased to be equal to or less than the degree to which the gradation values of the input G signal are decreased.

6. The video signal conversion device according to claim 1, wherein
the RGB converter
when it is designated, by the cataract degree designating signal, that it is the cataract with light scattering, decreases the gradation values of the input R signal, the input G signal, and the input B signal with a first conversion characteristic in the range from the minimum gradation value to the intermediate gradation value, and
when it is designated, by the cataract degree designating signal, that it is a cataract without light scattering, increases the gradation values of the input R signal, the input G signal, and the input B signal with a second conversion characteristic in the entire range from the minimum gradation value to the maximum gradation value.

7. The video signal conversion device according to claim 6, further comprising:
an interpolation converter configured to interpolate and convert the gradation values of the input R signal, the input G signal, and the input B signal so as to have a conversion characteristic between the first conversion characteristic and the second conversion characteristic according to the degree of light scattering.

8. A video signal conversion method comprising:
receiving a cataract degree designating signal that designates a degree of cataract including a degree of light scattering; and
when it is designated, by the cataract degree designating signal, that it is a cataract with light scattering, generating an output R signal, an output G signal, and an output B signal by decreasing gradation values of an input R signal, an input G signal, and an input B signal of three primary colors, in a range from the minimum gradation value to a predetermined intermediate gradation value less than the maximum gradation value, with a linear characteristic of not converting gradation values of the output R signal, the output G signal, and the output B signal as a reference with respect to the gradation values of the input R signal, the input G signal, and the input B signal.

9. The video signal conversion method according to claim 8, wherein
a degree to which gradation values of the input R signal, the input G signal, and the input B signal are decreased is increased as the degree of cataract becomes severe according to the degree of cataract indicated by the cataract degree designating signal.

10. The video signal conversion method according to claim 9, wherein
the gradation values of the input R signal are decreased in an entire range from the minimum gradation value to the maximum gradation value when the degree of cataract is milder than a predetermined degree, and
the gradation values of the input R signal are increased in a range up to the maximum gradation value beyond the intermediate gradation value with the linear characteristic as a reference when the degree of cataract is severe to be equal to or greater than the predetermined degree.

11. The video signal conversion method according to according to claim 8, wherein
the gradation values of the input G signal and the input B signal are increased in a range up to the maximum gradation value beyond the intermediate gradation value with the linear characteristic as a reference.

12. The video signal conversion method according to according to claim 8, wherein
the degree to which the gradation values of the input G signal are decreased is set to be equal to or less than the degree to which the gradation values of the input R signal are decreased, and
the degree to which the gradation values of the input B signal are decreased is set to be equal to or less than the degree to which the gradation values of the input G signal are decreased.

13. The video signal conversion method according to claim 8, wherein
when it is designated, by the cataract degree designating signal, that it is the cataract with light scattering, the gradation values of the input R signal, the input G signal, and the input B signal are decreased with a first conversion characteristic in the range from the minimum gradation value to the intermediate gradation value, and
when it is designated, by the cataract degree designating signal, that it is a cataract without light scattering, the gradation values of the input R signal, the input G signal, and the input B signal are increased with a second conversion characteristic in the entire range from the minimum gradation value to the maximum gradation value.

14. The video signal conversion method according to claim 13, further comprising:
interpolating and converting the gradation values of the input R signal, the input G signal, and the input B signal so as to have a conversion characteristic between the first conversion characteristic and the second conversion characteristic according to the degree of light scattering.

15. A non-transitory storage medium which stores a video signal conversion program causing a computer to execute the step of:
a receiving step of receiving a cataract degree designating signal that designates a degree of cataract including a degree of light scattering; and
when it is designated, by the cataract degree designating signal, that it is a cataract with light scattering, a generating step of generating an output R signal, an output G signal, and an output B signal by decreasing gradation values of an input R signal, an input G signal, and an input B signal of three primary colors, in a range from the minimum gradation value to a predetermined intermediate gradation value less than the maximum gradation value, with a linear characteristic of not converting gradation values of the output R signal, the output G signal, and the output B signal as a reference with respect to the gradation values of the input R signal, the input G signal, and the input B signal.

16. The non-transitory storage medium according to claim 15, wherein, as the generating step,
a degree to which gradation values of the input R signal, the input G signal, and the input B signal are decreased is increased as the degree of cataract becomes severe according to the degree of cataract indicated by the cataract degree designating signal.

17. The non-transitory storage medium according to claim 16, wherein, as the generating step,
the gradation values of the input R signal are decreased in an entire range from the minimum gradation value to the maximum gradation value when the degree of cataract is milder than a predetermined degree, and
the gradation values of the input R signal are increased in a range up to the maximum gradation value beyond the intermediate gradation value with the linear characteristic as a reference when the degree of cataract is severe to be equal to or greater than the predetermined degree.

18. The non-transitory storage medium according to claim 15, wherein, as the generating step,
the gradation values of the input G signal and the input B signal are increased in a range up to the maximum gradation value beyond the intermediate gradation value with the linear characteristic as a reference.

19. The non-transitory storage medium according to claim 15, wherein, as the generating step,
the degree to which the gradation values of the input G signal are decreased is set to be equal to or less than the degree to which the gradation values of the input R signal are decreased, and
the degree to which the gradation values of the input B signal are decreased is set to be equal to or less than the degree to which the gradation values of the input G signal are decreased.

20. The non-transitory storage medium according to claim 15, wherein, as the generating step, when it is designated, by the cataract degree designating signal, that is the cataract with light scattering, the gradation values of the input R signal, the input G signal, and the input B signal are decreased with a first conversion characteristic in the range from the minimum gradation value to the intermediate gradation value, and when it is designated, by the cataract degree designating signal, that it is a cataract without light scattering, the gradation values of the input R signal, the input G signal, and the input B signal are increased with a second conversion characteristic in the entire range from the minimum gradation value to the maximum gradation value.

21. The non-transitory storage medium according to claim 20, the video signal conversion program further causes the computer to execute:

interpolating and converting step of interpolating and converting the gradation values of the input R signal, the input G signal, and the input B signal so as to have a conversion characteristic between the first conversion characteristic and the second conversion characteristic according to the degree of light scattering.

* * * * *